Figure 1:
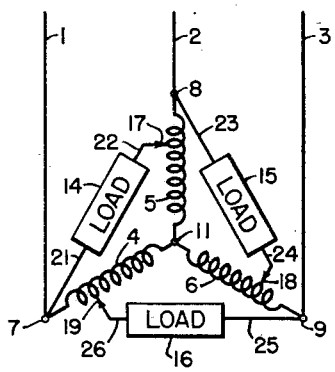

March 20, 1951     H. J. MORRISON     2,546,011

THREE-PHASE AUTOTRANSFORMER

Filed Jan. 14, 1949

WITNESSES:
Robert C. Baird
Nw. C. Groome

INVENTOR
Heber J. Morrison.
BY
Franklin E. Hardy
ATTORNEY

Patented Mar. 20, 1951

2,546,011

UNITED STATES PATENT OFFICE 2,546,011

THREE-PHASE AUTOTRANSFORMER

Heber J. Morrison, Baltimore, Md., assignor to Westinghouse Electric Corporation, East Pittsburgh, Pa., a corporation of Pennsylvania Application January 14, 1949, Serial No. 70,977

3 Claims. (Cl. 323—43.5)

My invention relates to an autotransformer and more particularly to a three-phase autotransformer for supplying variable loads where a large range of load varying capacity is required.

In certain industrial applications, it is desirable to provide means for supplying electrical energy to load devices at a controlled voltage which is variable over a considerable range of values corresponding to the necessities of the proper performance of the apparatus. For example, in a rectifier unit for use with radio transmitters, it is desirable to vary the applied voltage of the electrical power circuit for supplying the rectifier over a considerable voltage range. The usual way of doing this is to provide a transformer for stepping up the alternating voltage supplied to the transformer by a substantially constant amount and to provide additional voltage adjusting "buck and boost" transformers for delivering to the secondary circuit a voltage that is either below or above the output voltage of the main transformer by the amount of output voltage of the "buck and boost" transformer. The use of such additional transformers adds considerably to the cost of the transformer apparatus, and also limits the maximum utilization of the voltage adjustable transformer unless each section of the voltage adjustable transformer is wound and insulated to withstand line-to-line voltage rather than insulating only for the line-to-neutral voltage of a Y connected three-phase transformer.

In accordance with the invention, a three-phase autotransformer is employed having three windings connected in Y relation and a three-phase load to be supplied therefrom so connected that one terminal of each phase of the load is connected to a line conductor supplying the three-phase autotransformer and the other terminal of each phase of the load is connected through a brush or similar tap changing contact member that is movable over the turns of one of the three phase windings of the autotransformer so that as the brush is moved along the winding, the applied voltage across the load varies from line-to-line voltage between two conductors of the supply circuit to the voltage across one of the three Y connected windings. The three brushes associated respectively with the three secondary loads are controlled together so that by moving the brushes on the autotransformer, the load can be changed through a range of voltage values corresponding to the variation from a delta connected load to a Y connected load.

The brush current in the delta position of the brushes is $$\frac{\text{full load line current}}{\sqrt{3}}$$

diminishing to $$\frac{\text{full load line current}}{3}$$

when the brushes are in full Y position. The voltage variation from full line voltage is 42.3% of line voltage. The power handling capacity of such a transformer unit is 173.2% of the normal rating of the adjustable transformer.

It is an object of the invention to provide means for varying the voltage supplied to a three-phase alternating-current load comprising a Y connected three-phase autotransformer in which each of the three-phase loads is connected respectively between the outer terminal of one of the three Y connected autotransformer windings and a selected point of an adjacent phase winding of the autotransformer. In accordance with the invention, the selected points of connection of the three loads are simultaneously varied in like manner, so that the load connections vary from delta connection at one extreme position of the connecting brushes to Y connection at the other extreme position of the connecting brushes.

Figure 2:
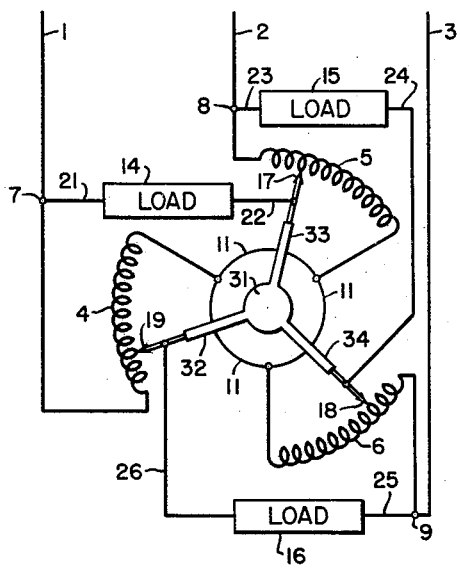
Figure 3:
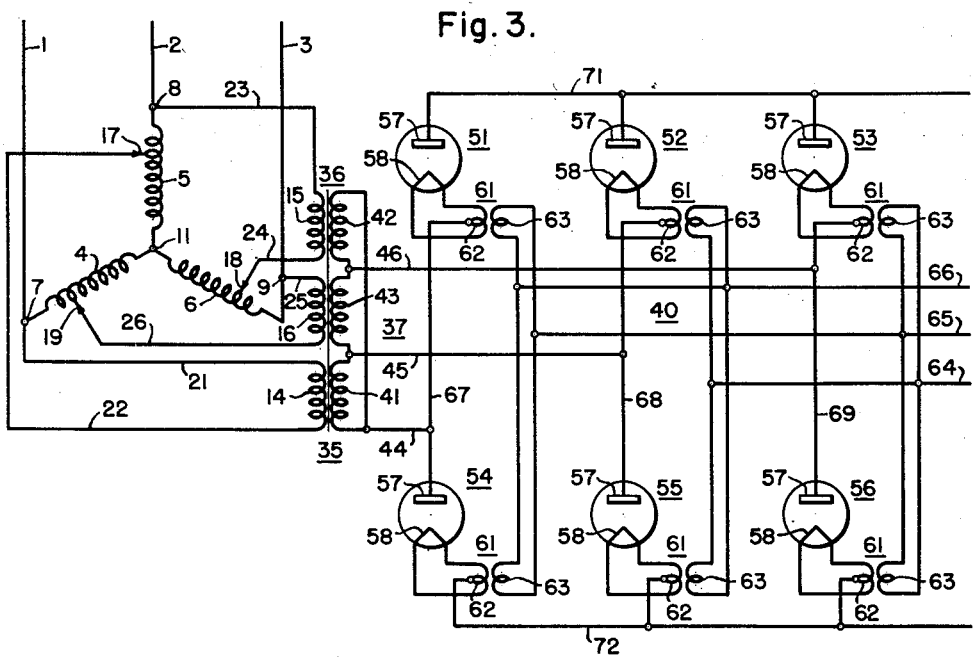

Other objects and advantages of the invention will be apparent from the following description of a preferred embodiment thereof, reference being had to the accompanying drawing, in which:

Figure 1 is a diagrammatic view of circuits and apparatus illustrating a three-phase autotransformer and load devices organized in accordance with the invention, Figure 2 is a diagrammatic view of circuits and apparatus illustrating the invention arranged to better illustrate the mechanical relation between the means for operating the several brushes for insuring similar operation of the brushes with respect to the three phase windings of the autotransformer; and Fig. 3 is a diagrammatic view illustrating the use of the invention for supplying a variable alternating voltage to a three-phase tube rectifier.

Referring to the drawing and particularly to Figs. 1 and 2 thereof, an alternating-current supply circuit represented by three conductors 1, 2 and 3 is provided for supplying alternating-current electrical energy to an autotransformer having three phase windings 4, 5 and 6, the outer terminals 7, 8 and 9 of which are connected, respectively, to conductors 1, 2 and 3 and the inner terminals of which are connected at 11 to a neutral point, thus forming a Y connection between the three windings.

Three load elements 14, 15 and 16 are provided receiving power from the autotransformer. One end of each of the three load elements 14, 15 and 16 is connected to the terminals or junction points 7, 8 and 9, respectively, between the line conductors 1, 2 and 3 and the outer ends of the three autotransformer windings connected thereto. The other ends of the three load elements are connected to brushes 17, 18 and 19, respectively, that are arranged to slide along the turns of the windings 5, 6 and 4, respectively, to vary the points of connection of the load elements to these windings.

For example, the load element 14 is connected between the line conductors 1 at 7 through conductors 21 and 22 and the brush 17 to a selected turn on the winding 5. The load element 15 is connected between the line conductor 2 at the terminal 8, through conductors 23 and 24 and the brush 18 to a selected turn on the winding 6. The load element 16 is connected between the line conductor 3 at the terminal 9 through conductors 25 and 26 and the brush 19 to a selected turn on the winding 4.

As best shown in Fig. 2, the three brushes 17, 18 and 19 are mechanically connected together to operate simultaneously by means illustrated as a rotatable operating member 31 provided with three arms 32, 33 and 34 carrying the three brushes 19, 17 and 18, respectively. When the brushes are in one extreme position of their range of travel, that is at the outer ends of their travel as illustrated in Fig. 1, or in the extreme counterclockwise position of the travel as illustrated in Fig. 2, the load elements 14, 15 and 16 are connected in delta relation to each other and between the three supply conductors 1, 2 and 3. When the brushes 17, 18 and 19 are at the other end of their range of travel, that is, connected to the neutral point 11, the three load elements are then connected in Y relation.

As shown in Fig. 3, the load elements 14, 15 and 16 may be the primary windings of three transformers 35, 36 and 37 having secondary windings 41, 42 and 43, respectively, connected in delta relation for supplying alternating current at a relatively high voltage to a three-phase rectifier indicated generally by the numeral 40.

The rectifier 40 includes six diode tubes 51, 52, 53, 54, 55 and 56, each provided with an anode 57 and a cathode 58. The cathode 58 is a hot filament cathode that is heated through a cathode transformer 61 having a secondary winding 62 connected to the filament 58 and a primary winding 63 connected across two of the three conductors 64, 65 and 66 providing a three-phase alternating-current circuit for energizing the several cathode transformers 61 associated with the six tubes. As illustrated, the three secondary conductors 44, 45 and 46 from the secondary windings of the three transformers 35, 36 and 37 are connected, respectively, to conductors 67, 68 and 69, each of which is connected to the anode 57 of one tube and to the cathode 58 of another tube, as illustrated, to provide a well-known type of six tube rectifier for converting three-phase alternating current into direct current impressed across conductors 71 and 72. The conductor 71 is connected to the anodes 57 of the three tubes 51, 52 and 53 and the conductor 72 is connected to the cathodes 58 of the three tubes 54, 55 and 56 in a well-known manner.

It will be apparent that with the use of the three-phase autotransformer connected, as illustrated and described, with the three load elements supplied from the supply circuit 1, 2 and 3 through the autotransformer in the manner illustrated and described, with provisions for changing the voltage applied to the load elements within a range corresponding to a delta connected load supplied from the supply circuit to a Y connected load supplied from the same circuit, that it is possible to obtain a considerable range in the voltage applied to the load elements and the currents flowing therethrough with the use of a single three-phase autotransformer, thus eliminating the necessity of employing the usual main transformer with additional "buck and boost" auxiliary transformers.

It will be apparent to those skilled in the art that modifications may be made in the apparatus and circuits illustrated and described without departing from the invention, and I do not wish to be limited otherwise than in accordance with the appended claims.

I claim as my invention:

1. In combination, a three-phase alternating current supply circuit having three phase conductors, an autotransformer having three phase windings, one end of each phase winding being connected to a neutral point and the other ends of the three phase windings being connected, respectively, to the three phase conductors of the supply circuit, three load elements each having one end connected to one of the three terminals of the three phase windings, the other ends of the three phase load elements being connected to movable tap changing switches for making contact with selected turns of the three phase windings, and means for simultaneously operating the three tap changing switches to change connections of the three phase load elements from one end of a range of operation corresponding to a delta connection of the three load elements to the other end of the range of operation corresponding to a Y connection of the three load elements.

2. In combination, a three-phase alternating-current circuit having three supply conductors, an autotransformer having three windings each connected between one of the three circuit conductors and a neutral point common to the three windings to establish a Y connected set of windings, three load elements each connected at one end to one of the three supply conductors, respectively, the other end of each of the load elements being connected to a movable tap changing switches for making contact with selected turns of one of the three autotransformer windings to vary the point of connection of the load element to the winding, there being three tap changing switches, one for each of the three autotransformer windings, and means for simultaneously moving the three tap changing switches between the line terminal ends of the three autotransformer windings and the neutral point of the three windings for simultaneously varying the voltages applied to the three load elements between line-to-line delta voltage between the three supply conductors and line-to-neutral Y voltage.

3. In combination, a three-phase alternating-current circuit having three supply conductors, an autotransformer having three windings each connected between one of the three circuit conductors and a neutral point common to the three windings to establish a Y connected set of windings, three load elements each connected at one end to one of the three supply conductors, respectively, the other end of each of the load elements being connected, respectively, to a tap changing switch that is slidable along the turns of one of the three autotransformer windings to vary the point of connection of the load element to the winding, there being three tap changing switches, one for each of the three autotransformer windings connected to make a symmetrical pattern of connections between the three load elements and the three autotransformer windings, and means for simultaneously moving the three tap changing switches between the line terminal ends of the three autotransformer windings and the neutral point of the three windings for simultaneously varying the voltages applied to the three load elements between line-to-line delta voltage between the three supply conductors and line-to-neutral Y voltage.

HEBER J. MORRISON.

REFERENCES CITED

The following references are of record in the file of this patent:

UNITED STATES PATENTS

| Number | Name | Date |
|---|---|---|
| 2,000,776 | Mercereau | May 7, 1935 |